(12) United States Patent
Shevy et al.

(10) Patent No.: US 6,498,799 B1
(45) Date of Patent: Dec. 24, 2002

(54) SINGLE-MODE FIBER RING LASER

(75) Inventors: Yaakov Shevy, Coral Gables, FL (US); Amnon Yariv, San Marino, CA (US); Dan Provenzano, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 78 days.

(21) Appl. No.: 09/639,205

(22) Filed: Aug. 14, 2000

Related U.S. Application Data

(60) Provisional application No. 60/149,239, filed on Aug. 12, 1999.

(51) Int. Cl.[7] ............................................. H01S 3/30
(52) U.S. Cl. ........................... 372/6; 372/94; 372/102; 385/37; 385/39; 359/341.32
(58) Field of Search .......................... 359/341.1, 341.2, 359/341.33, 341.4, 341.41, 341.42, 342, 245, 343, 347, 341.32; 372/94, 102, 6, 40, 41, 42; 385/31, 37, 39, 50

(56) References Cited

U.S. PATENT DOCUMENTS

| | | | | |
|---|---|---|---|---|
| 5,181,210 A | * | 1/1993 | Chung et al. ................. | 372/19 |
| 5,243,609 A | * | 9/1993 | Huber ........................ | 372/102 |
| 5,434,701 A | * | 7/1995 | Fatehi et al. ................. | 359/244 |
| 5,561,546 A | | 10/1996 | Esman ....................... | 359/245 |
| 5,805,751 A | | 9/1998 | Kewitsch et al. ............. | 385/43 |
| 5,875,272 A | * | 2/1999 | Kewitsch et al. ............. | 385/24 |

* cited by examiner

Primary Examiner—Cassandra Spyrou
Assistant Examiner—Arnel C. Lavarias
(74) Attorney, Agent, or Firm—Fish & Richardson P.C.

(57) ABSTRACT

Fiber ring lasers that combine a fiber Fabry-Perot resonator and a fiber grating coupler to produce a single-mode laser output.

22 Claims, 3 Drawing Sheets

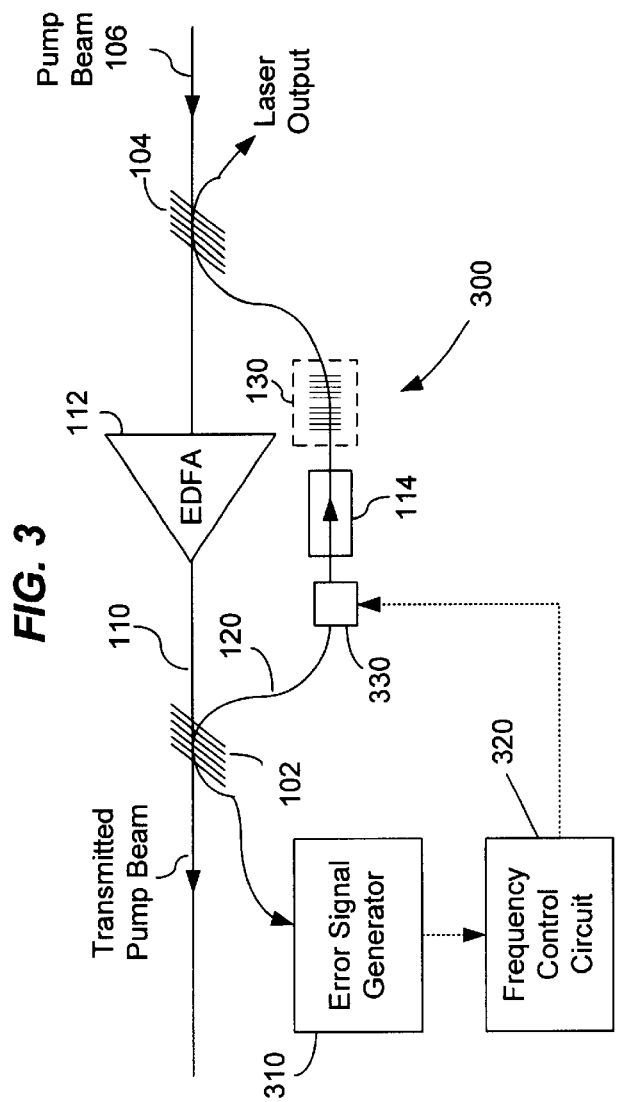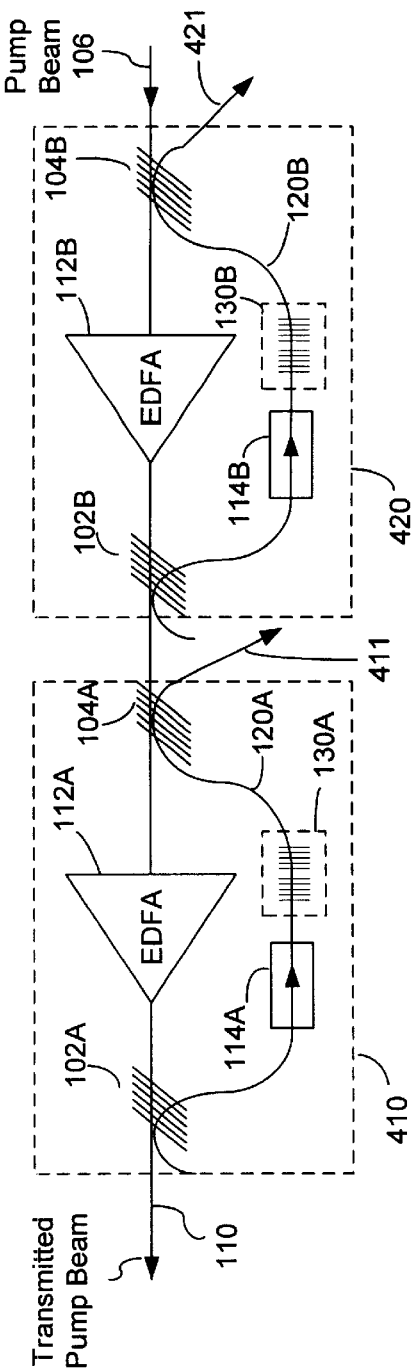

US 6,498,799 B1

SINGLE-MODE FIBER RING LASER

RELATED PATENT APPLICATIONS

This application claims the benefit of U.S. Provisional Application No. 60/149,239, filed Aug. 12, 1999.

BACKGROUND

This application relates to optical fiber devices and lasers, and in particular, to single-mode fiber ring lasers.

A fiber ring laser may be constructed by using a closed fiber loop to form a ring optical resonator. The fiber ring includes at least a portion of a doped fiber as the laser gain medium which can produce an optical gain within a spectral range in response to an optical pump beam at a selected pump wavelength or within a specified pump spectral range. The fiber ring provides an optical feedback to circulate the photons at one or more wavelengths within the gain spectral range.

A laser oscillation in the fiber ring occurs at a laser wavelength within the gain spectral range when two operating conditions are met. First, the total optical gain at that laser wavelength exceeds the total optical loss in the fiber ring, and secondly, the optical phase delay associated with a round trip within the fiber ring is 360 degrees or a multiple of 360 degrees. The gain spectral range of the doped fiber, such as erbium (Er)-doped fibers, usually have a large bandwidth and hence allows multiple modes at different frequencies to oscillate at the same time. A single-mode oscillation can be achieved by selecting one particular mode to oscillate while suppressing other modes.

Various applications require single model laser oscillations. For example, wavelength-division-multiplexing (WDM) has been used to expand the capacity of a fiber communication link by simultaneously transmitting different optical waves at different WDM wavelengths. One commonly-used WDM wavelength standard is the International Telecommunication Union (ITU) standard, where the WDM wavelengths of different optical waves are required to match ITU grid frequencies. Hence, each laser transmitter needs to operate in a single mode at a designated WDM wavelength. Other applications for single-mode laser oscillations include precision spectroscopic measurements and nonlinear optical processes, among others.

Fiber ring lasers are emerging as a new generation of compact, inexpensive and robust laser sources to produce single-mode oscillations for WDM systems and other applications where a single-mode laser oscillation is desirable.

SUMMARY

This application includes techniques and devices that use optical fibers and fiber grating devices to construct single-mode fiber ring lasers.

DESCRIPTION OF DRAWINGS

FIG. 3 shows a frequency control servo coupled to the laser shown in FIG. 1.

FIGS. 4A and 4B show two examples of a fiber laser with two or more fiber ring lasers that are coupled to a common fiber by sharing a common pump beam.

Like reference symbols in the various drawings indicate like elements.

DETAILED DESCRIPTION

The techniques and devices of this disclosure define different types of wavelength-selective fiber devices based on fiber gratings to achieve a single-mode operation in a fiber ring resonator.

A first type is a fiber grating coupler to operate as a filter so that only optical energy at wavelengths within the reflective bandwidth of the fiber grating coupler is optically amplified in the fiber ring resonator while the gain of the amplified spontaneous emissions at any other wavelength is suppressed. A second type is a fiber Fabry-Perot resonator having two Bragg gratings as the resonator reflectors to select only a single ring laser mode that is in resonance with a transmission peak of the fiber Fabry-Perot resonator.

Figure 1:
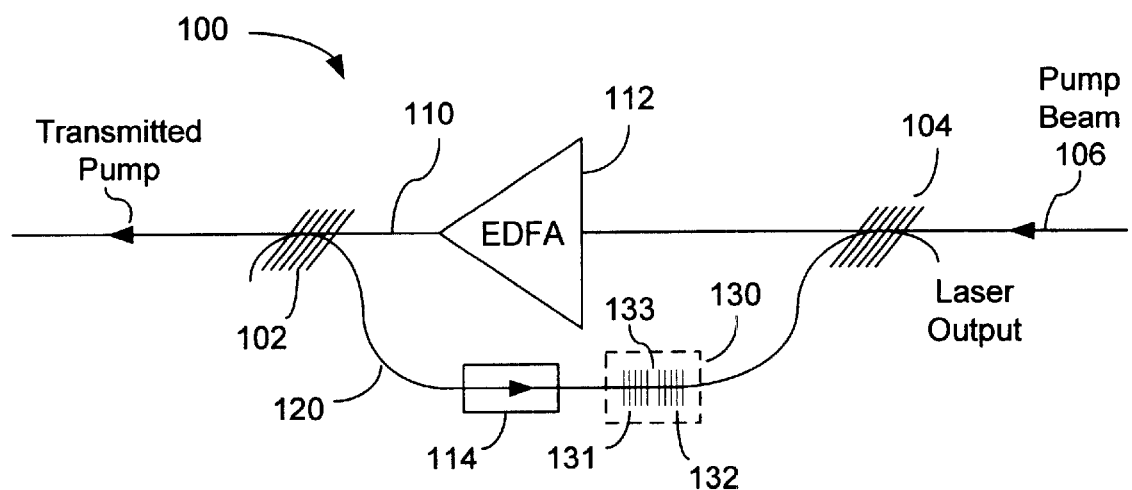
FIG. 1 shows a single-mode fiber ring laser according to one embodiment.

FIG. 1 shows a fiber ring laser 100 according to one embodiment of the present disclosure. The fiber ring resonator includes two fibers 110 and 120 that are coupled together by two fiber grating couplers 102 and 104 at two different locations. At least a portion of the fiber 110 is doped as the laser gain medium 112 which produces an optical gain at each wavelength within its gain spectral range when optically pumped at a selective pump wavelength or within a pump spectral range. Other fiber sections in the fiber ring resonator, such as the fiber 120, may also be doped to increase the total gain. An optical isolator 114 is used at a position in either of the fibers 110 and 120 to circulate the photons within the fiber ring in a single direction. Two identical and closely spaced fiber gratings 131 and 132 are fabricated in either of the fibers 110 and 120 to form a fiber Fabry-Perot resonator 130 and to select one of the ring cavity modes at a time to oscillate.

The fiber gain medium 112 is doped to have desired optical transitions within a gain spectral range for laser oscillation. Atomic transitions in rare-earth ions, for example, may be used to produce lasers from visible wavelengths to far infrared wavelengths. Er-doped fiber amplifiers (EDFA) for producing optical signals at 1.55 microns are particularly useful in optical fiber communication applications because the optical loss in the commonly-used silica fibers is minimum at about 1.55 microns. As illustrated in FIG. 1, a portion or the entire section of the fiber 110 between the couplers 102 and 104 may be doped. Alternatively, a portion or entirety of the fiber 120, or both fibers 110 and 120, between the couplers 102 and 104, may be doped.

The fiber ring laser 100 may be optically pumped by a pump beam 106 that is coupled into the fiber 110. A suitable pump wavelength is preferably at a wavelength outside the gain spectral range of the doped region and is usually shorter than the laser wavelength. For example, $Er^{+3}$ ions can be doped in silica/fluoride fibers to produce laser oscillations at 1.55 microns when optically pumped at 980 nm or 1480 nm.

The pump light source that produces the pump beam 106 may include a LED or a laser diode to produce pump light at one or more pump wavelength in resonance with at least one optical transition in the doped fiber gain medium 112 for producing photons at the laser wavelength. The fiber 110 may be directly coupled to the light source or indirectly through an optical coupler to receive the pump beam 106.

Figure 2:
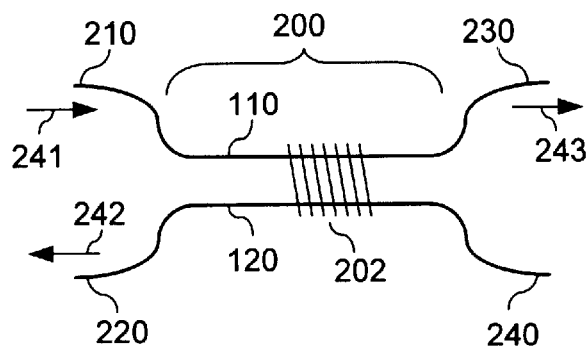
FIG. 2 illustrates the operation of a fiber grating coupler used in the laser shown in FIG. 1.

Referring to FIG. 2, each of the fiber grating couplers 102 and 104 is a 4-port coupler that joins two fibers 110 and 120 together at a coupling region 200. A fiber grating 202 is formed in the coupling region 200. The fibers 110 and 120, the coupling region 200, and the fiber grating 202 are designed so that the 4-port coupler operates as a special wavelength-selective coupler with 4 parts 210, 220, 230, and 240. More specifically, a selected wavelength within a reflective bandwidth of the fiber grating 202, when received by one fiber (e.g., fiber terminal 210 in the fiber 110), will be reflected back to another fiber on the same side of the fiber coupler (e.g., fiber terminal 220 in the fiber 120). This reflected beam does not go back to the original input fiber. However, when a beam at a wavelength outside the reflective bandwidth of the grating is sent into a fiber of the coupler (e.g., the terminal 210 in the fiber 110), the beam does not interact with the fiber grating 202 and is not coupled to another fiber. Instead, the beam continues to propagate in the same fiber through the coupling region 200 and exits at the other end of that same fiber (e.g., terminal 230 in the fiber 110).

The above fiber grating coupler may be designed in two different configurations. In a total reflective configuration, the fiber grating 202 is designed so that a beam at the selected wavelength is essentially totally reflected into another fiber. Alternatively, in a partial reflective configuration, the fiber grating 202 is designed so that it reflects a portion of the beam (e.g., 241 in the terminal 210 of the fiber 110) at the selected wavelength back (e.g., 242) to the other fiber (e.g., terminal 220 of the fiber 120) on the same side of the coupling region 200 while transmitting the remaining portion of the beam (e.g., 243) to the other side of the coupling region 200 in the same fiber (e.g., terminal 230 in the fiber 110). In the system 100 in FIG. 1, for example, the coupler 102 may be designed to be nearly totally reflective and the coupler 104 may be partially reflective to produce a laser output from the fiber 120.

Exemplary implementations for the fiber grating couplers 102 and 104 include grating assisted mode couplers disclosed in U.S. Pat. Nos. 5,805,751 and 5,875,272 to Kewitsch et al. The two fibers 110 and 120 are locally dissimilar in the coupling region 200 so that they support different waveguide modes. As a result, an input beam at a selected wavelength within the reflective bandwidth under the Bragg condition, after entering the coupling region 200 from the port 210 in the fiber 110, is reflected by the fiber grating 202 to the port 220 in another fiber 120 in a different waveguide mode supported by the fiber 120 that is at the same selected wavelength. This grating assisted mode coupling can substantially reduce or eliminate the optical loss. Therefore, the above fiber grating couplers 102 and 104 can provide light coupling and filtering more efficiently than conventional circulators that are typically used in some add/drop filters.

In the fiber ring laser 100 shown in FIG. 1, both fiber grating couplers 102 and 104 may be designed to have a common reflective bandwidth that covers one or more desired laser wavelengths in the doped fiber gain medium 112. In operation, the pump beam 106 coupled into the fiber 110 remains in the fiber 110 without being coupled to the fiber 120. This is because the pump wavelength is different from the one or more laser wavelengths and is outside the reflective bandwidth. The doped portion 112 in the fiber 110 absorbs part of the pump beam 106 and produces spontaneous emissions at the one or more laser wavelengths within the gain spectral range and at other wavelengths. The unabsorbed pump beam 106 exits the fiber ring in the same fiber 110, and may be used to pump one or more other fiber ring lasers that are coupled to the fiber 110 to share the same pump beam and lase at different laser wavelengths.

The spontaneous emissions at different wavelengths produced by the doped gain medium 112 are filtered by the fiber grating couplers 102 and 104 so that only the photons at wavelengths within the reflective bandwidth are reflected back into the fiber ring and are further multiplied in the doped portion 112. Hence, in the presence of the optical isolator 114, photons at wavelengths within the reflective bandwidth are reflected from the fiber 120 to the fiber 110 at the coupler 104 and from the fiber 110 to the fiber 120 at the coupler 102 to circulate in the fiber ring in a counter clockwise direction. Photons at other wavelengths outside the reflective bandwidth, however, exit the fiber ring by transmitting through the fiber grating couplers 102 and 104. Therefore, undesired spontaneous emissions are effectively suppressed. In addition, the couplers 102 and 104 also limit the number of modes of the fiber ring that can simultaneously lase to the ratio of the reflective bandwidth of the couplers 102 and 104 to the frequency spacing between two adjacent modes. This wavelength-selective filtering by the couplers 102 and 104 can be used to achieve a relatively high signal-to-noise ratio and operational stability in the laser oscillation.

The gain spectral range of the doped gain medium 112 is generally broad and hence can allow multiple resonator modes to coexist simultaneously in the fiber ring within the reflective bandwidth of the couplers 102 and 104. One function of the fiber Fabry-Perot resonator 130 is to select one mode at a time from all possible ring cavity modes to oscillate in a single mode. The fiber Bragg gratings 131 and 132 of the fiber Fabry-Perot resonator may have the same grating period and are spaced from each other by a gap. Each fiber grating operates as a reflector to selectively reflect light at a Bragg wavelength that satisfies the Bragg phase matching condition and to transmit other spectral components. This Bragg wavelength is equal to twice of the product of the effective index of the refraction of the fiber and grating period.

Since both gratings 131 and 132 have the same grating period, they are reflective at the same wavelength. The reflection of the gratings 131 and 132 is not limited to a single wavelength but rather has a reflection bandwidth where each grating is reflective to light at any wavelength within the bandwidth. The reflection bandwidth of each grating is a function of the grating strength which depends on the depth of the periodic modulation on the fiber's index of refraction and the number of periods in each grating. Hence, the two spaced gratings 131 and 132 form a Fabry-Perot cavity only for light at the Bragg wavelength within the reflective bandwidth.

Light at the Bragg wavelength in such a Fabry-Perot cavity 130 will be reflected by the gratings 131 and 132 to bounce back and forth to cause light interference. A constructive interference occurs to create a transmission peak at a resonance when the round-trip phase delay is 360 degrees or any multiple of 360 degrees. The optical transmission of the Fabry-Perot cavity 130 decays as the phase delay deviates from the resonance and becomes zero when the phase delay deviates from the resonance exactly by 180 degrees. As the phase delay continues to change, the optical transmission begins to increase and reaches to the peak value when another resonance condition is met. This behavior is periodic with respect to the round-trip phase delay. This round-trip phase delay is essentially determined by the product of the effective index of refraction of the fiber and the gap 133 and a resonance peak occurs when the product is equals to one half of the wavelength. When expressed in frequency, the round-trip phase delay represents the frequency difference between two adjacent resonant peaks and is called the free spectral range (FSR) of the Fabry-Perot cavity. Only one single transmission peak within the reflection bandwidth is possible in the fiber Fabry-Perot cavity 130 if the reflection bandwidth of the fiber gratings 131 and 132 is less than FSR. A particular mode of the fiber ring resonator is selected when it overlaps with the single transmission peak of the fiber Fabry-Perot cavity 130. The fiber gratings 131 and 132 can be made to position the single transmission peak of the fiber Fabry-Perot resonator substantially at the center of the reflective bandwidth of the fiber grating couplers 102 and 104. This may be achieved by, for example, adjusting the grating period by stretching the portion of the fiber in which the gratings 131 and 132 are formed. After the fiber ring laser 100 is assembled, the overlap between one of the ring cavity modes and the transmission peak of the fiber Fabry-Perot resonator 130 can be actively maintained by using a feedback servo to stretch or change the temperature of the fiber.

In the single-mode operation, the output frequency of the fiber ring laser may drift or fluctuate due to various internal processes (e.g., shot noise and other fluctuations) or environmental factors (e.g., a change in temperature or vibrations). The temperature variations can be kept to a minimum with temperature compensation packaging techniques, including using materials with proper temperature expansion coefficient, and by stabilizing the temperature of the laser components. Moreover, the laser operating frequency can naturally lock to the fiber Fabry-Perot resonance. This mechanism can greatly enhance the operating stability of the laser when the Fabry-Perot resonance is narrow compared with the ring cavity free spectral range $\Delta v = c/nL$, where c is the velocity of light and L is the ring cavity length. This is due to the sharp dispersion curve of the Fabry-Perot resonance. The enhanced stability of the laser frequency f is given by:

$$\frac{\partial f}{f} = -\frac{\partial (nL)}{nL} \frac{1}{1 - \Phi' \Delta v / 2\pi}$$

where $\Phi'$ is the slope of the dispersion of the Fabry-Perot resonance. For example: with $\Delta v = 0.5$ GHz and $\Phi' = 2\pi \text{Rad}/0.25$ GHz, the laser operating stability against changes in its optical length (nL) (due to mechanical stress or temperature) is a factor of 3 better than that of a ring laser without the fiber Fabry-Perot resonator.

In addition to the above self-locking mechanism a frequency control servo can be implemented to stabilize the laser frequency with respect to a frequency reference. The frequency reference can be either the internal Fabry-Perot resonance or an external locker.

In the case of internal locker, as the laser ring mode deviates from the peak transmission of the resonance the laser power will decrease. Therefore, a logic servo circuit can restore the ring mode to coincide with the Fabry-Perot resonance.

FIG. 3 shows a fiber ring laser 300 with an external frequency reference. The servo includes an error signal generator 310, a frequency control circuit 320, and a fiber stretching element 330 coupled to either the fiber 110 or the fiber 120. The error signal generator 310 receives a portion of the laser beam from any part of the fiber ring (e.g., from a small amount of leakage in the fiber coupler 102) and compares the frequency of the laser to the frequency reference. The frequency difference between the laser frequency and the frequency reference is used to generate an error signal. The control circuit 320 produces a correction signal to the fiber stretching element 330 according to the error signal. The fiber stretching element 330 in turn adjusts the total length of the fiber ring to reduce or minimize the difference between the laser frequency and the frequency reference.

One embodiment of the error signal generator 310 includes another fiber grating Fabry-Perot resonator formed in a fiber with different indices of refraction along two orthogonal axes perpendicular to the fiber. Two closed spaced resonance peaks can be generated for two orthogonal polarizations along the axes. The frequency at the middle between the two peaks can be used as the frequency reference. In another embodiment, the error signal generator 310 includes two fiber grating Fabry-Perot resonators with slightly different grating periods to produce the two closed spaced resonance peaks. These techniques are described in detail in U.S. Patent Application, In Fiber Frequency Locker, filed on Aug. 11, 2000 based on priority from U.S. Provisional Application No. 60/149,004 filed Aug. 13, 1999, the disclosure of which is incorporated herein by reference.

FIG. 4A shows a fiber laser 400 with two or more fiber ring lasers coupled to a common fiber 110 in a serial configuration. Two fiber ring lasers 410 and 420 are illustrated to respectively produce two different laser outputs 411 and 421 at different wavelengths, where the laser 410 has a fiber 120A with an optical isolator 114A and the laser 420 has a fiber 120B with an optical isolator 114B. The fiber grating devices 102A, 104A and 130A in the first fiber ring laser 410 have different reflective wavelengths from the fiber grating devices 102B, 104B, and 130B in the second fiber ring laser 420. A common fiber 110 is used to deliver the common pump beam 106 to both fiber ring lasers 410 and 420. Two sections of the fiber 110 respectively in the two lasers 410 and 420 are doped to form gain regions 112A and 112B. The transmitted portion of the pump beam 106 from the first fiber ring laser 410 is used to pump the second fiber ring laser 420. As long as the transmitted pump out of a fiber ring laser is sufficiently strong, an additional fiber ring laser can be added to the common fiber 110.

Figure 4B:
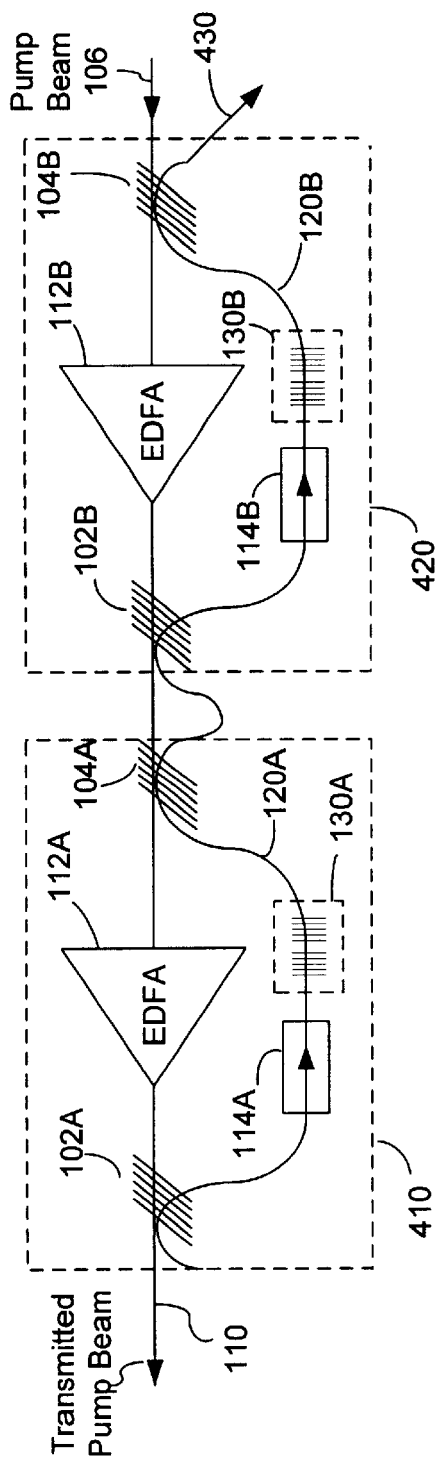

FIG. 4B shows that the fiber 120A that produces the laser output in the first fiber ring laser 410 may be connected to the fiber 120B that produces the laser output in the second fiber ring laser 420. Since the two laser wavelengths are different, the laser output from the first laser 410 can propagate through the fiber 120B without being coupled by the couplers 102B and 104B and thus mix with the laser output from the second fiber ring laser 420 to produce a wavelength-division multiplexed output 430.

Figure 5:
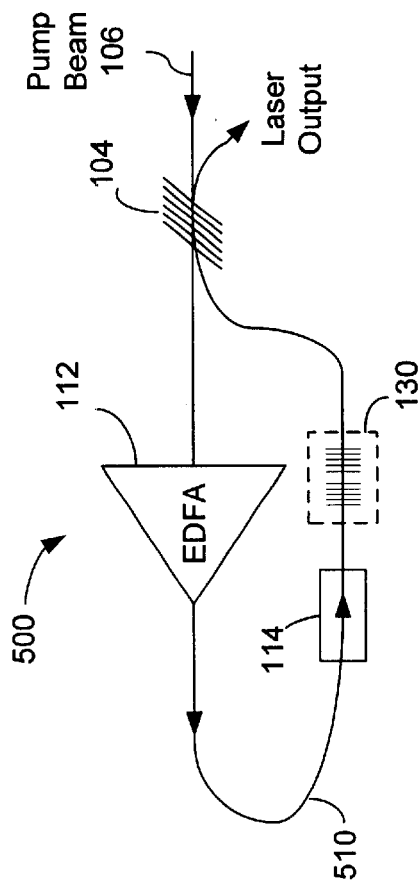
FIG. 5 shows another embodiment of a single-mode fiber ring laser.

FIG. 5 shows a fiber ring laser 500 with only one fiber grating coupler 104. A single fiber 510 is used to form a fiber ring by using the grating coupler 104 to couple two different sections of the fiber 510 together. At least a part 112 of the fiber 510 within the fiber ring is doped to form a gain region.

A number of embodiments have been described. Nevertheless, various modifications and enhancements may be made. For example, the two fiber grating couplers 102 and 104 in FIG. 1 may have two slightly shifted reflective bandwidths to limit the wavelengths of photons that can remain in the fiber ring within the partial overlapped spectral range between the two bandwidths. This can further reduce the undesired amplified spontaneous emissions in comparison with the laser 100 where the reflective bandwidths of the two couplers 102 and 104 essentially completely overlap. As another example, the above configurations and techniques may also be applicable to ring lasers formed from waveguides.

These and other variations and modifications are intended to be encompassed by the following claims.

What is claimed is:

1. A device, comprising:
   a fiber ring having at least a portion that is doped to form a laser gain medium to absorb a pump beam at a pump wavelength and to produce a laser beam at a laser wavelength different from said pump wavelength;
   a fiber Fabry-Perot resonator including two spaced fiber gratings formed in said fiber ring and reflective to light at said laser wavelength, said fiber Fabry-Perot resonator operable to select and allow transmission of a selected fiber ring cavity mode; and
   a fiber grating coupler to couple two different fiber segments together and configured to have a fiber grating formed in said fiber segments, wherein said fiber grating in said fiber grating coupler is at least partially reflective to direct light at said laser wavelength from one fiber segment to another within said fiber ring but is transmissive to light at said pump wavelength to send said pump beam out of said fiber ring.

2. The device as in claim 1, wherein said two spaced fiber Fabry-Perot resonator has a free spectral range greater than a reflective bandwidth of said two spaced fiber gratings.

3. The device as in claim 1, further comprising an optical isolator in said fiber ring.

4. The device as in claim 1, wherein said laser gain medium includes a rare earth element.

5. The device as in claim 1, wherein said two different fiber segments coupled to said fiber coupler are dissimilar to each other.

6. A device, comprising:
   a first fiber to have at least a portion between two selected positions that is doped to produce an optical gain within a gain spectral range in response to an optical pump beam at a pump wavelength outside said gain spectral range;
   a second fiber having two portions coupled to said first fiber at said two selected positions, respectively, to form first and second coupling regions so that said first and said second fibers form a fiber ring;
   first and second fiber grating couplers respectively formed in said first and said second coupling regions, each having a fiber grating that reflects light at a wavelength within said gain spectral range from one of said first and said second fibers to another within said fiber ring but transmits light at said pump wavelength out of said fiber ring; and
   a fiber Fabry-Perot resonator including two spaced fiber gratings formed at a location in said fiber ring and reflective to light at a wavelength within said gain spectral range, said fiber Fabry-Perot resonator operable to select and allow transmission of at least one fiber ring cavity mode.

7. The device as in claim 6, wherein said first and said second fiber grating couplers have the same reflective bandwidth.

8. The device as in claim 6, wherein said first and second fiber grating couplers have different but overlapped reflective bandwidths.

9. The device as in claim 6, wherein said fiber Fabry-Perot resonator has a free spectral range greater than a reflective bandwidth of its fiber gratings.

10. The device as in claim 6, further including an optical isolator in either of said first and said second fibers.

11. The device as in claim 6, further comprising:
   an error signal generator coupled to receive light from said fiber ring at a wavelength within said spectral gain medium to determine a deviation from a selected reference;
   a fiber element engaged to a selected location in said fiber ring to change an optical path of said fiber ring in response to a control signal; and
   a control circuit coupled to receive information indicating said deviation and to produce said control signal.

12. The device as in claim 6, further comprising:
   another doped portion in said first fiber outside a portion between said two positions to produce an optical gain within another gain spectral range in response to said optical pump beam at said pump wavelength which is outside said another gain spectral range;
   a third fiber having two portions coupled to said first fiber at another two selected positions, respectively, to form third and fourth coupling regions so that said first and said third fibers form another fiber ring separate from said fiber ring;
   third and fourth fiber grating couplers respectively formed in said third and said fourth coupling regions, each having a fiber grating that reflects light at a wavelength within said another gain spectral range from one of said first and said third fibers to another within said another fiber ring but transmits light at said pump wavelength out of said another fiber ring; and another fiber Fabry-Perot resonator including two spaced fiber gratings formed at a location in said another fiber ring and reflective to light at a wavelength within said another gain spectral range, said another fiber Fabry-Perot resonator operable to select and allow transmission of at least one cavity mode of said another fiber ring.

13. The device as in claim 12, wherein said third fiber is coupled to receive light from said second fiber.

14. The device as in claim 6, further comprising an optical isolator in said fiber ring.

15. The device as in claim 6, wherein said fiber Fabry-Perot resonator has a free spectral range greater than a reflective bandwidth of said two spaced fiber gratings.

16. A method, comprising:

coupling a pump beam at a pump wavelength into a fiber ring with a doped gain section which produces photons at wavelengths different from said pump wavelength;

using a fiber grating coupler to couple two different segments of said fiber ring together that transmits said pump beam and reflects one or more of said wavelengths; and using two fiber gratings to form a fiber Fabry-Perot resonator in said fiber ring to select one mode of said fiber ring to produce a laser.

17. The method as in claim 16, further comprising making a free spectral range of said fiber Fabry-Perot resonator to be greater than a reflective bandwidth of said fiber gratings.

18. The method as in claim 16, further comprising:

receiving a portion of the laser to determine a frequency deviation of said laser from a frequency reference; and using the deviation to control a length of said fiber ring or the temperature to reduce the frequency deviation.

19. The method as in claim 18, using the internal fiber resonator as a frequency reference and a portion of the laser power to determine the frequency deviation; and using the deviation to control a length of said fiber ring to reduce the frequency deviation.

20. The device as in claim 1, wherein said two fiber segments in said fiber ring that is coupled together by said fiber grating coupler are located on the same side of said fiber grating coupler.

21. The device as in claim 6, wherein a portion of said second fiber within said fiber ring that receives reflected light from one of said first and said second fiber grating couplers is coupled to said one fiber grating coupler on the same side with a portion of said first fiber in said fiber ring.

22. The device as in claim 16, wherein said two fiber segments in said fiber ring that is coupled together by said fiber grating coupler are located on the same side of said fiber grating coupler.

* * * * *

UNITED STATES PATENT AND TRADEMARK OFFICE
CERTIFICATE OF CORRECTION

PATENT NO.     : 6,498,799 B1
DATED          : December 24, 2002
INVENTOR(S)    : Yaakov Shevy, Amnon Yariv and Dan Provenzano It is certified that error appears in the above-identified patent and that said Letters Patent is hereby corrected as shown below:

<u>Column 1,</u>
Line 8, add the following paragraph:

-- NOTICE OF GOVERNMENT CONTRACT
The U.S. Government has certain rights in this invention pursuant to Grant No. ECS 9806922 awarded by the National Science Foundation. --

Signed and Sealed this

Twenty-second Day of April, 2003

JAMES E. ROGAN
*Director of the United States Patent and Trademark Office*